(12) United States Patent
Sanders et al.

(10) Patent No.: US 11,884,526 B1
(45) Date of Patent: Jan. 30, 2024

(54) VEHICLE JACK

(71) Applicants: Earnest Sanders, Arlington, TX (US); Curtis B. Sanders, Arlington, TX (US)

(72) Inventors: Earnest Sanders, Arlington, TX (US); Curtis B. Sanders, Arlington, TX (US)

( * ) Notice: Subject to any disclaimer, the term of this patent is extended or adjusted under 35 U.S.C. 154(b) by 261 days.

(21) Appl. No.: 17/233,958

(22) Filed: Apr. 19, 2021

(51) Int. Cl.
*B60B 29/00* (2006.01)
*B66F 5/02* (2006.01)

(52) U.S. Cl.
CPC .......... *B66F 5/025* (2013.01); *B60B 29/001* (2013.01); *B60B 29/002* (2013.01); *B60B 29/008* (2013.01); *B60B 2340/50* (2013.01)

(58) Field of Classification Search
CPC ....... B25J 9/162; B25J 9/0024; B60B 29/008; B60B 29/001; B60B 29/006; B60B 29/002; B60B 2340/50; B60C 25/0515
USPC .......................................... 414/590; 254/7 B
See application file for complete search history.

(56) References Cited

U.S. PATENT DOCUMENTS

| 4,267,901 A * | 5/1981 | Tsujimura | B66F 7/00 187/214 |
| 4,505,455 A * | 3/1985 | Beatty | B66F 7/04 254/89 H |
| 7,077,031 B1 * | 7/2006 | Frederiksen | B23P 19/069 81/57.32 |
| 2002/0112027 A1 * | 8/2002 | McHugh | H04L 9/40 709/219 |
| 2005/0087728 A1 * | 4/2005 | Falk | B66F 5/04 254/2 R |
| 2007/0261499 A1 * | 11/2007 | Hamilton | G01M 17/007 73/865.6 |
| 2009/0242720 A1 * | 10/2009 | Charters | B60S 11/00 24/457 |
| 2015/0307132 A1 * | 10/2015 | Marinescu | B62D 17/00 280/86.751 |
| 2020/0122531 A1 * | 4/2020 | Yao | B60B 29/001 |

FOREIGN PATENT DOCUMENTS

| CN | 110217047 A | * | 6/2019 |
| CN | 111376645 A | * | 1/2020 |
| CN | 113715556 A | * | 11/2020 |
| CN | 113183682 A | * | 7/2021 |

OTHER PUBLICATIONS

Hub Stand Mounted on Harbor Freight Dolly (Year: 2020).*
PacoMato Hub Stands (Year: 2023).*

* cited by examiner

*Primary Examiner* — Mahdi H Nejad
(74) *Attorney, Agent, or Firm* — Kenneth L. Tolar

(57) ABSTRACT

An improved vehicle jack includes a motorized lift plate that either raises or lowers a vehicle when the motor is operated in one of two directions. The jack also includes a lug-nut removal tool formed of a telescoping, pivotal shaft having an adjustable head at an upper end. A plurality of motorized, magnetized sockets are positioned on the head for tightening and loosening lug nuts. Accordingly, the lift plate is activated to raise the vehicle, and the sockets are properly positioned to automatically remove, retain, and reinstall the wheel's lug nuts.

10 Claims, 1 Drawing Sheet

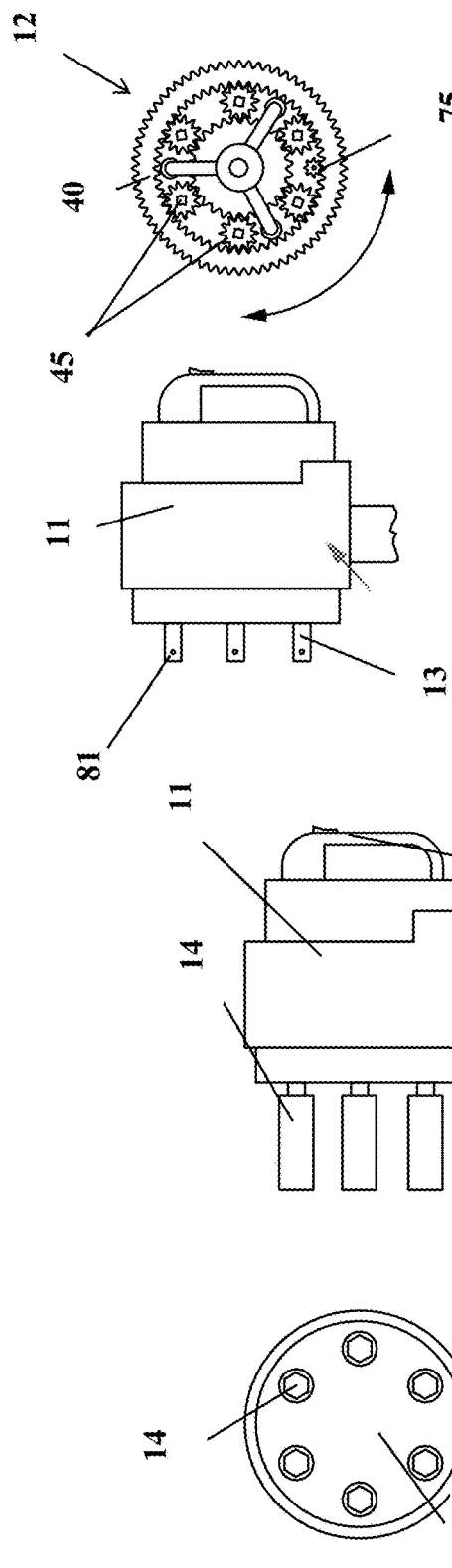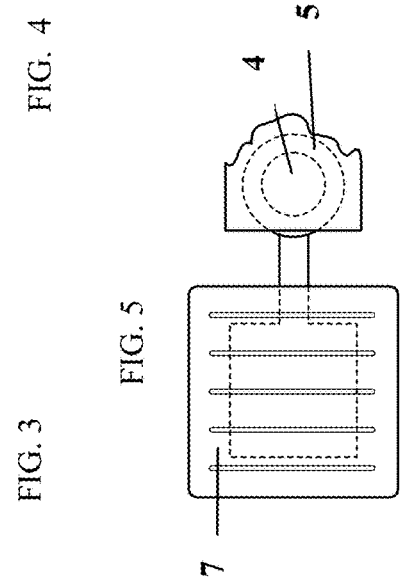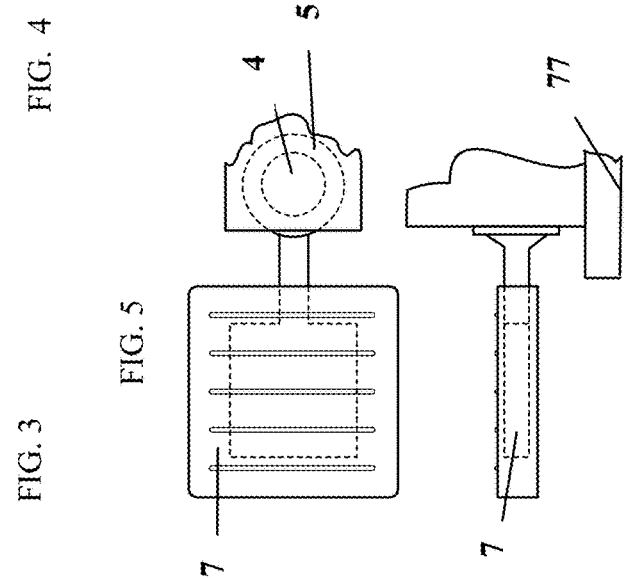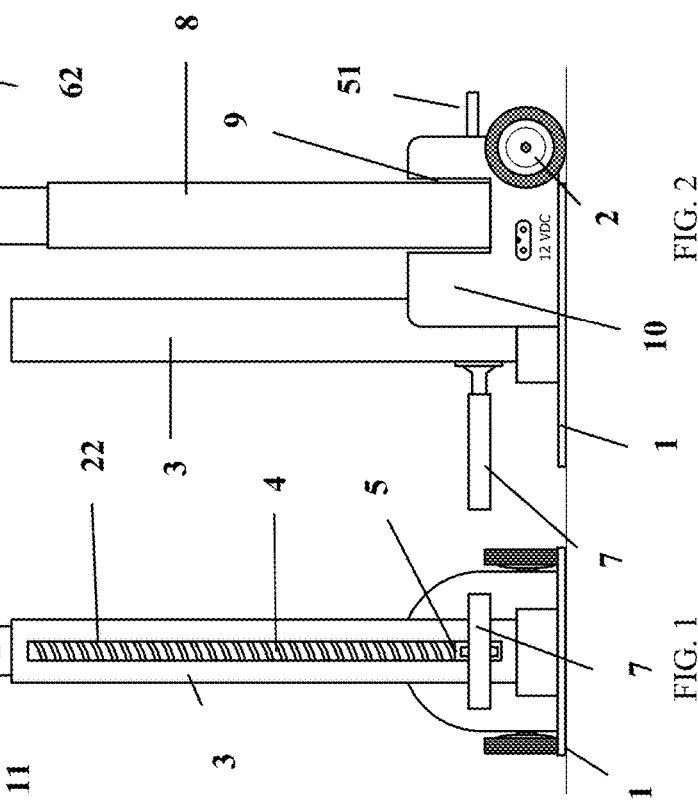

1

VEHICLE JACK

BACKGROUND OF THE INVENTION

The present invention relates to a motorized vehicle jack having a tool that automatically removes, secures, and reinstalls the wheel's lug nuts.

DESCRIPTION OF THE PRIOR ART

To change a flat tire, a driver must retrieve a jack and a lug-nut wrench from a storage compartment, position the jack beneath the vehicle, manually loosen the lug nuts with the wrench and raise the vehicle to a sufficient height to allow the inflated replacement tire to be installed. The lug nuts and flat tire are removed, the replacement tire is installed, and the lug nuts are reattached. Operating the jack and manually removing and reinstalling the lug nuts are laborious, strenuous, and time-consuming tasks. Furthermore, while the replacement tire is being installed, the lug nuts are easily scattered around the vehicle, causing further delay and aggravation.

Accordingly, there is currently a need for a vehicle jack that allows a driver to quickly and easily change a flat tire. The present invention addresses this need by providing a motorized vehicle jack having a tool for automatically removing, retaining, and reinstalling the wheels' lug nuts.

SUMMARY OF THE INVENTION

The present invention relates to an improved vehicle jack comprising a motorized lift plate that either raises or lowers a vehicle when the motor is operated in one of two directions. The jack also includes a lug-nut removal tool formed of a telescoping, pivotal shaft having an adjustable head at an upper end. A plurality of motorized, magnetized sockets are positioned on the head for tightening and loosening lug nuts. Accordingly, the lift plate is activated to raise the vehicle, and the sockets are properly positioned to automatically remove, retain, and reinstall the wheel's lug nuts.

It is therefore an object of the present invention to provide an improved vehicle jack that automatically lifts a vehicle.

It is another object of the present invention to provide an improved vehicle jack that automatically removes, retains, and reinstalls lug nuts.

Other objects, features and advantages of the present invention will become readily apparent from the following detailed description of the preferred embodiment when considered with the attached drawings and the appended claims.

BRIEF DESCRIPTION OF THE DRAWINGS

FIG. 1 is a front, plan view of the vehicle jack according to the present invention.
FIG. 2 is a side view of the vehicle jack.
FIG. 3 is an isolated view of the head.
FIG. 4 is an isolated view of the planetary gear assembly.
FIG. 5 is an isolated top view of the lift plate.
FIG. 6 is an isolated side view of the lift plate.

DESCRIPTION OF THE PREFERRED EMBODIMENT

The present invention relates to an improved vehicle jack comprising a base panel 1 having a lift mechanism and a lug-nut removal tool positioned thereon. The base panel 1 is mounted on a pair of casters 2 that allow the jack to be easily transported along an underlying surface. The lift mechanism includes a vertical tower 3 having an elongated, motorized drive screw 4 received therein. An internally threaded collar 5 mounted on the drive screw includes an arm 6 extending through a longitudinal slot 22 on the tower. At a distal end of the arm is a lift plate 7 that is either raised or lowered when the reversible motor 77 is operated in one of two directions. The lift plate 7 is encapsulated with a contoured, molded-rubber pad for frictionally engaging a vehicle chassis to prevent vehicle slippage even when raining. A foot switch 51 operates the motor in the selected direction when a downward force is applied thereto.

The lug-nut removal tool includes an elongated, telescoping shaft 8 having an upper end a lower end. The lower end is pivotally attached to the base plate and is received within an arcuate slot 9 formed on the lift-motor housing 10. Accordingly, the shaft can pivot within a plane that is parallel to the side of a vehicle in order to lower the tool to align with lug nuts on a given tire. At the upper end of the shaft is a head 11 having a planetary gear assembly 12 received therein. The planetary gear assembly is driven by a high-torque motor and a drive gear 75 that generate enough torque to remove or firmly tighten tire lug nuts. The planetary gear assembly 12 includes an annular outer gear 40 that rotates a plurality of inner gears 45 in either of two directions. A drive member 13 attached to each inner gear 45 includes a ball detent 81 that removably mates with a magnetized socket 14 configured to couple with a corresponding lug nut. A rocker switch 62 drives the planetary gear system in either of the two directions to remove or install lug nuts. The head 11 is affixed to an outer tube that is slidably mounted on an inner tube fastened to the shaft 8 so that the head is horizontally slidable relative to the shaft 8 to move the sockets toward and away from the wheel's lug nuts.

To change a flat tire, a driver positions the lift plate 7 beneath a vehicle, near the tire, and engages the foot switch 51 to raise the vehicle to an appropriate height. The shaft 8 is pivoted until the sockets 14 are substantially aligned with the lug nuts and the head is then slid toward the wheel until the lug nuts are properly received within the sockets. The rocker switch 62 is engaged to activate the motor in a first direction to remove the lug nuts then the shaft 8 is pivoted to allow the wheel to be removed. While the replacement tire is being mounted on the wheel, the magnetized sockets conveniently retain the lug nuts to prevent inadvertent misplacement. The replacement tire is installed, the head is pivoted to align the lug nuts with their corresponding wheel bolts, and the motor is reversed to tighten the lug nuts against the tire rim.

The above-described device is not limited to the exact details of construction and enumeration of parts provided herein. For example, though the device has been primarily depicted and described as including a pair of motors, the motors can be eliminated and the lift mechanism and lug nut removal tool can be driven by a battery-powered or 120 VAC drill motor. Both the lift mechanism and lug nut removal tool would include a hexagonal shaft for mating with a hexagonal drive socket on the drill, or the drill's chuck can be attached directly to the mechanisms. Furthermore, the size, shape, and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A vehicle jack comprising:
a base plate having a vertical tower positioned thereon;
an elongated drive screw received within said vertical tower;
a threaded collar mounted on said drive screw;
a lift plate attached to said collar for positioning beneath a vehicle chassis;
a reversible motor operably connected to said drive screw for rotating said drive screw in either of two directions to move said collar and said lift plate upwardly or downwardly;
a lug-nut removal tool mounted on said base plate, said lug-nut removal tool including an elongated, telescoping shaft having an upper end, a lower end and a head at the upper end of the shaft, said shaft pivotally attached to said base plate to pivot said head within a plane that is parallel to a side of a vehicle in order to lower said head to align with lug nuts on a given tire;
a plurality of motorized sockets on said head adapted to couple with the lug nuts on a tire rim;
a housing receiving said reversible motor, said housing having a slot formed thereon, wherein the lower end of said shaft is pivotally attached to the base plate and is received within said slot to allow the head to move along an arcuate path in a vertical plane.

2. The vehicle jack according to claim 1 wherein said lift plate is encapsulated with a contoured, molded rubber pad for frictionally engaging the vehicle chassis to prevent vehicle slippage.

3. The vehicle jack according to claim 1 further comprising a foot-operated switch that operates said motor in said either of two directions.

4. The vehicle jack according to claim 1 wherein said sockets are magnetized to secure said lug nuts while a tire is being repaired.

5. The vehicle jack according to claim 1 wherein said head is horizontally movable relative to said shaft to properly position the sockets onto said lug nuts.

6. The vehicle jack according to claim 1 wherein said base plate is mounted on a pair of casters that allow the vehicle jack to be transported along an underlying surface.

7. The vehicle jack according to claim 1 wherein said head includes a planetary gear assembly received therein for driving said motorized sockets.

8. The vehicle jack according to claim 7 wherein said planetary gear assembly comprises an annular outer gear that rotates a plurality of inner gears in either of two directions.

9. The vehicle jack according to claim 8 further comprising a drive member attached to each of said inner gears, said drive member including a ball detent that removably mates with one of said magnetized sockets.

10. The vehicle jack according to claim 7 further comprising a second motor that drives said planetary gear system in either of the two directions to remove or install said lug nuts.

* * * * *